(12) United States Patent
Ichikawa et al.

(10) Patent No.: US 9,328,885 B2
(45) Date of Patent: May 3, 2016

(54) VEHICLE LIGHTING UNIT

(71) Applicant: Stanley Electric Co., Ltd., Tokyo (JP)

(72) Inventors: Asaki Ichikawa, Tokyo (JP); Norifumi Imazeki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 67 days.

(21) Appl. No.: 14/168,942

(22) Filed: Jan. 30, 2014

(65) Prior Publication Data

US 2014/0211493 A1 Jul. 31, 2014

(30) Foreign Application Priority Data

Jan. 30, 2013 (JP) .................................. 2013-014908

(51) Int. Cl.
*F21V 9/00* (2015.01)
*F21S 8/10* (2006.01)
*F21V 7/00* (2006.01)
*F21V 8/00* (2006.01)

(52) U.S. Cl.
CPC .............. *F21S 48/00* (2013.01); *F21S 48/225* (2013.01); *F21S 48/2237* (2013.01); *F21S 48/2268* (2013.01); *F21S 48/2281* (2013.01); *F21V 7/0025* (2013.01); *G02B 6/0001* (2013.01)

(58) Field of Classification Search
CPC ..... F21S 48/00; F21S 48/2237; F21S 48/225; F21S 48/2268; F21S 48/2281; F21V 7/0025; G02B 6/0001
USPC .......................................................... 362/511
See application file for complete search history.

(56) References Cited

U.S. PATENT DOCUMENTS

| 6,097,549 A * | 8/2000 | Jenkins et al. ................. 359/726 |
| 7,188,981 B2 * | 3/2007 | Rodriguez Barros et al. .............................. 362/494 |
| 7,290,906 B2 * | 11/2007 | Suzuki et al. .................. 362/511 |
| 2006/0171159 A1 * | 8/2006 | Anderlini ....................... 362/511 |
| 2010/0246200 A1 * | 9/2010 | Tessnow et al. .............. 362/509 |
| 2012/0069592 A1 | 3/2012 | Natsume et al. |
| 2012/0099310 A1 | 4/2012 | Kropac et al. |

FOREIGN PATENT DOCUMENTS

| DE | 10 2010 027 648 A1 | 5/2012 |
| EP | 2 048 430 A2 | 4/2009 |
| JP | 2012-4004 A | 1/2012 |
| JP | 2012-243539 A | 12/2012 |
| WO | 01/28815 A2 | 4/2001 |

OTHER PUBLICATIONS

The extended European Search Report for the related European Patent Application No. 14020011.4 dated Apr. 29, 2014.

* cited by examiner

*Primary Examiner* — Evan Dzierzynski
*Assistant Examiner* — Tsion Tumebo
(74) *Attorney, Agent, or Firm* — Kenealy Vaidya LLP

(57) ABSTRACT

A vehicle lighting unit includes LEDs mounted on a substrate, and an elongated inner lens configured to receive light from the LEDs and guide the light along its lengthwise direction so as to emit light from its front surface. The inner lens includes a first light guiding section extending in the left-to-right direction and a second light guiding section extending in the vertical direction, and a bending section between the first and second light guiding sections. The bending section includes a first reflection surface and a second reflection surface. The first and second reflection surfaces internally reflect light toward the first and second light guiding sections, respectively. The LEDs include a first LED and a second LED, disposed in the rear of the first reflection surface and the second reflection surface, respectively.

9 Claims, 5 Drawing Sheets

VEHICLE LIGHTING UNIT

This application claims the priority benefit under 35 U.S.C. §119 of Japanese Patent Application No. 2013-014908 filed on Jan. 30, 2013, which is hereby incorporated in its entirety by reference.

TECHNICAL FIELD

The presently disclosed subject matter relates to a vehicle lighting unit

BACKGROUND ART

As one conventional example of various vehicle lighting units to be mounted in a vehicle body, those including an elongated light guide which is to be illuminated are known. When a bent light guide such as those in the form of a letter U shape or the like is illuminated in this type of vehicle lighting unit, if a light source such as a light emitting diode (LED) is disposed only at one of ends of the elongated light guide, the light entering the light guide may be attenuated as it is guided therethrough. As a result, the uniformity of the light emission state in the lengthwise direction of the light guide may deteriorate. To cope with this problem, in general, both the ends of the light guide are configured to face respective light sources as shown in FIG. 1. (See, for example, Japanese Patent Application Laid-Open No. 2012-243539).

However, this type of vehicle lighting unit should include light sources at two locations separated away from each other. This means that two separate substrates for mounting the respective light sources are required, resulting in increasing the number of parts compared with the case where only one light source is provided.

In addition, since the light sources are disposed to face the respective ends of the elongated light guide, they must be concealed by some means (concealing members) such as extensions so that the light sources at two separate locations cannot be directly observed in front of them. This also causes an increased number of parts for the concealing members. This may also inhibit the provision of the vehicle lighting unit in a desired location in a vehicle body. Specifically, the end of the light guide cannot be located at the end of a lighting chamber due to the provision of the light source at the end of the light guide, meaning that the end of the lighting unit cannot be illuminated.

SUMMARY

The presently disclosed subject matter was devised in view of these and other problems and features in association with the conventional art. According to an aspect of the presently disclosed subject matter, a vehicle lighting unit can be configured to be capable of disposing a bent elongated light guide to be aligned to the end of a lighting chamber of the lighting unit while the uniformity of light emission state across the entire length of the bent elongated light guide can be ensured with fewer numbers of parts compared with the conventional lighting unit.

According to another aspect of the presently disclosed subject matter, a vehicle lighting unit for emitting light in a front direction can include a light source mounted on a substrate, and an elongated light guide configured to receive light emitted from the light source and to guide the light along its lengthwise direction so as to emit light from its front surface, the light guide having a first light guiding section and a second light guiding section that extend in a first direction and a second direction, respectively, and a bending section between the first and second light guiding sections, the first direction and the second direction crossing each other when viewed from its front side so that the light guide can bend at the bending section. In this configuration, the bending section can include a first reflection surface and a second reflection surface. The first reflection surface can internally reflect light from the rear side toward the first light guiding section substantially in the first direction. The second reflection surface can internally reflect the light from the rear side toward the second light guiding section substantially in the second direction. The light source can include a first light source and a second light source. The first light source can be disposed in the rear of the first reflection surface of the bending section while facing forward. The second light source can be disposed in the rear of the second reflection surface of the bending section while facing forward.

In the above-described vehicle lighting unit, the substrate can extend to be orthogonal to the front-to-rear direction of the vehicle lighting unit and have a front surface, and the first and second light sources can be mounted on the front surface of the substrate.

In the above-described vehicle lighting unit, the first reflection surface can be formed in the bending section at one of the ends on a side opposite to the first light guiding section, and the second reflection surface can be formed in the bending section at one of the ends on a side opposite to the second light guiding section.

In the above-described vehicle lighting unit, the bending section can include a light incident section at its rear portion so that the light incident section faces the light source, the light incident section receiving light emitted from the light source so that the light can enter the bending section.

In the above-described vehicle lighting unit, the light guide can have a rear surface including a plurality of prism cuts having a saw-tooth shaped cross section formed over substantially the entire rear surface so as to direct the guided light forward. Specifically, the rear surface can include a recessed section along the entire length of the light guide except for a rim portion with a predetermined width and the plurality of prism cuts can be formed in the bottom face of the recessed section. Furthermore, part the plurality of prism cuts can be formed in parallel to each other and side by side along the first direction in the area of the rear surface corresponding to the first light guiding section and the bending section while part of the plurality of prism cuts can be formed in parallel to each other and side by side along the extending direction of the second light guiding section in the area of the rear surface corresponding to the second light guiding section so that the plurality of prism cuts can reflect the light entering the light guide forward.

In the vehicle lighting unit with the above-described configuration, the light emitted forward from the first light source can enter the light guide through the rear portion of the bending section and be reflected by the first reflection surface in the first direction, thereby being guided through the first guiding section to exit through the front surface of the first light guiding section. Further, the light emitted forward from the second light source can enter the light guide through the rear portion of the bending section and be reflected by the second reflection surface in the second direction, thereby being guided through the second guiding section to exit through the front surface of the second light guiding section.

With this configuration, the first light guiding section and the second light guiding section of the light guide can independently become luminous by the respective first and second light sources. Accordingly, the resulting light guide can become luminous more uniformly when compared with the case where a light source is arranged only at one end of a light guide in a conventional configuration.

In the vehicle lighting unit with the above-mentioned configuration, both the first and second light sources can be disposed in the rear of the bending section of the light guide. Thus, when compared with the conventional case where light sources are disposed to face respective ends of an elongated light guide, the first and second light sources can be collectively mounted on a single substrate. In addition to this, a concealing member for concealing a light source can be eliminated, and in turn, the number of parts can be decreased. Even with this configuration, the above-mentioned vehicle lighting unit can achieve the provision of the respective ends of the first and second light guiding sections opposite to the bending section at the respective end portions of the lighting chamber.

Therefore, with fewer numbers of parts than the conventional lighting unit, it is possible to dispose an elongated bent light guide at respective end portions of the lighting chamber while the light guide can become luminous uniformly.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments.

Figure 1:
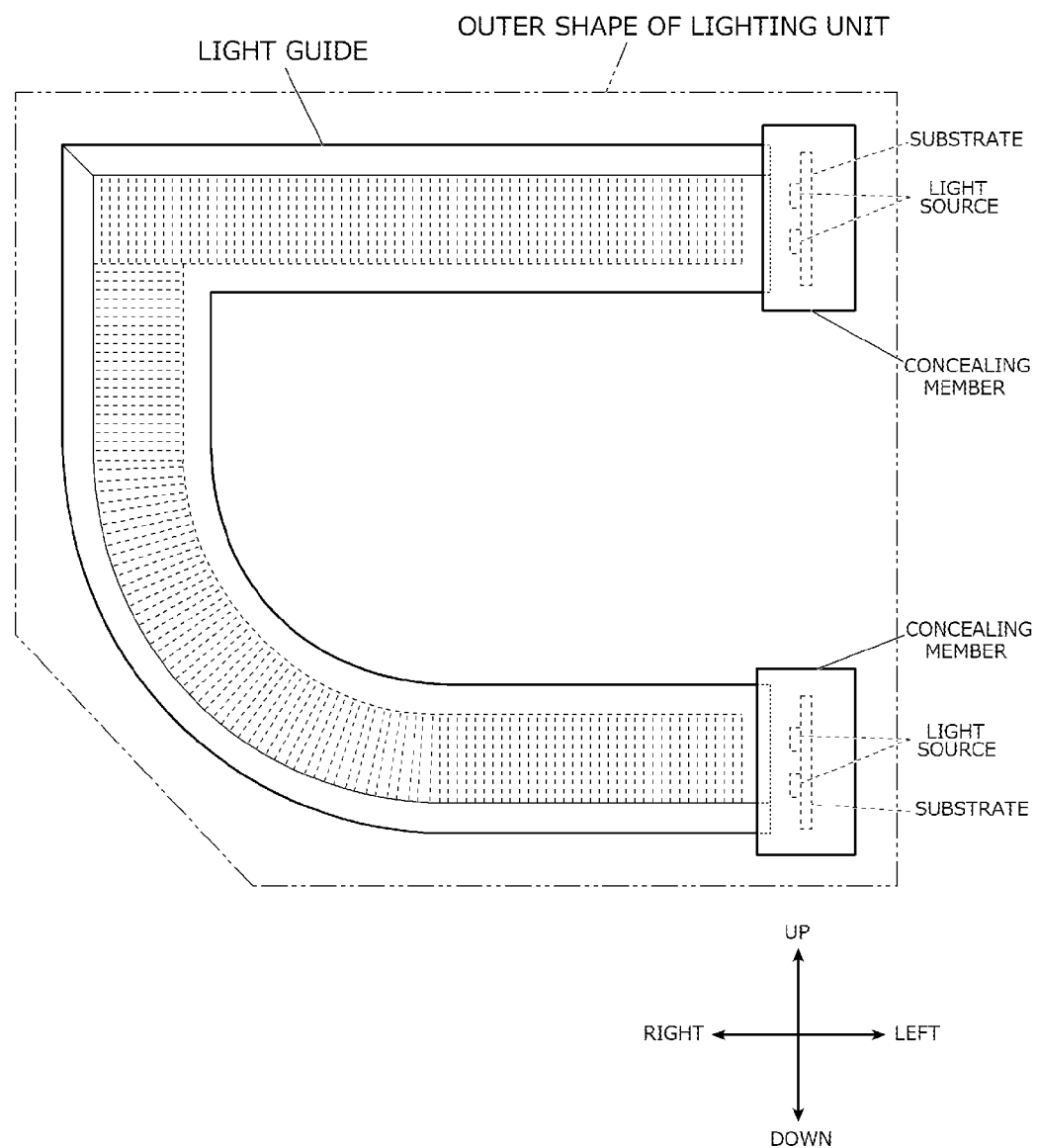
FIG. 1 is a front view of parts of a conventional vehicle lighting unit.
Figure 2:
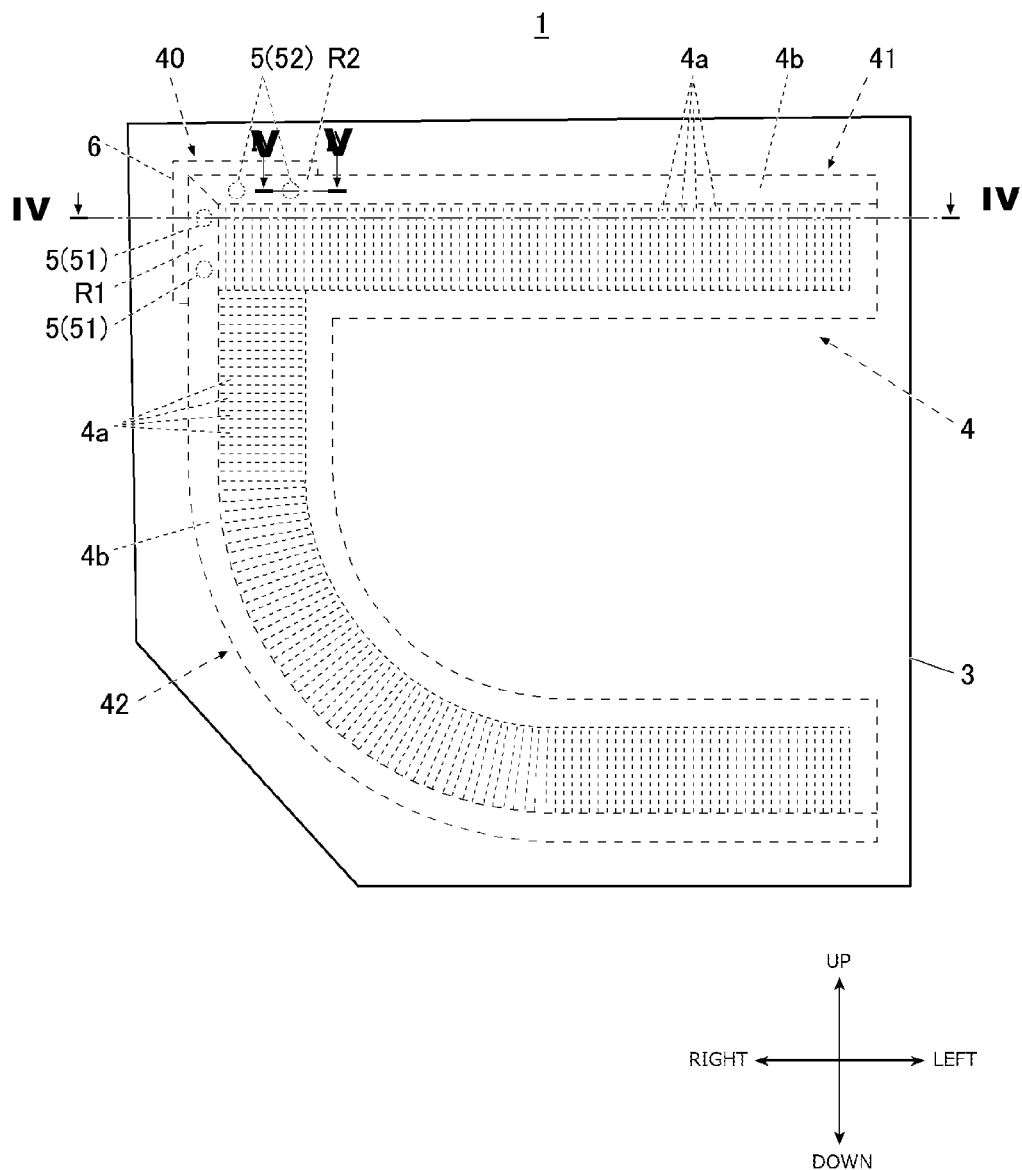
FIG. 2 is a front view of an exemplary vehicle lighting unit made in accordance with principles of the presently disclosed subject matter.
Figure 3:
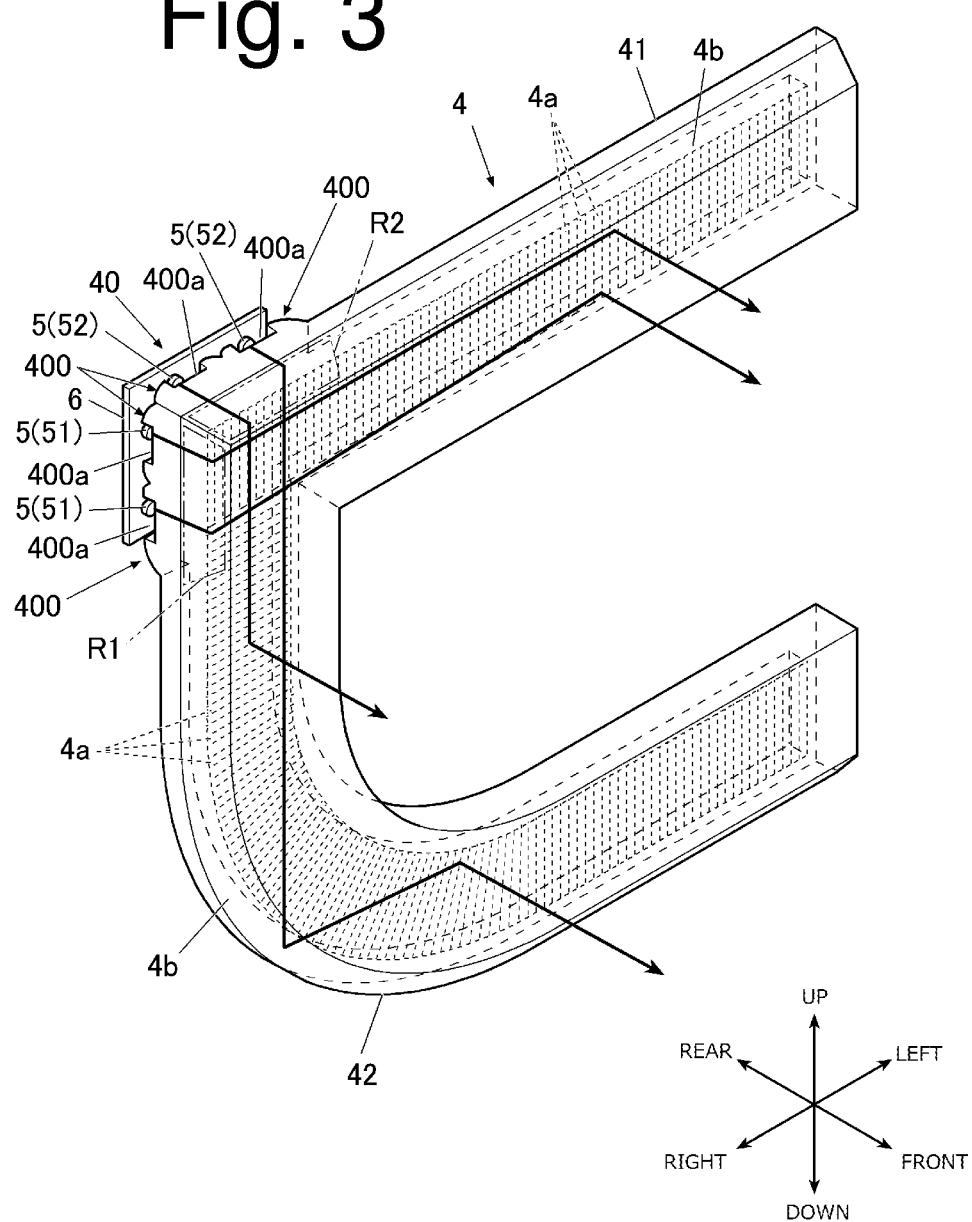
FIG. 3 is a perspective view of parts of the vehicle lighting unit of FIG. 2.
Figure 4:
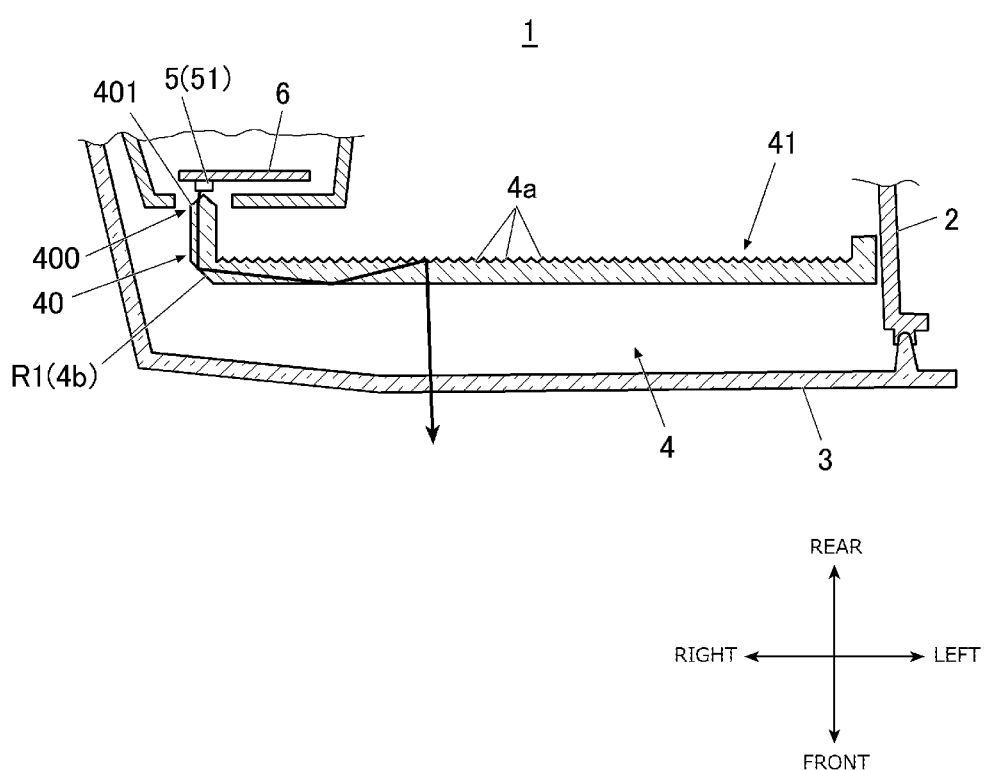
FIG. 4 is a cross-sectional view of the vehicle lighting unit taken along line IV-IV of FIG. 2.
Figure 5:
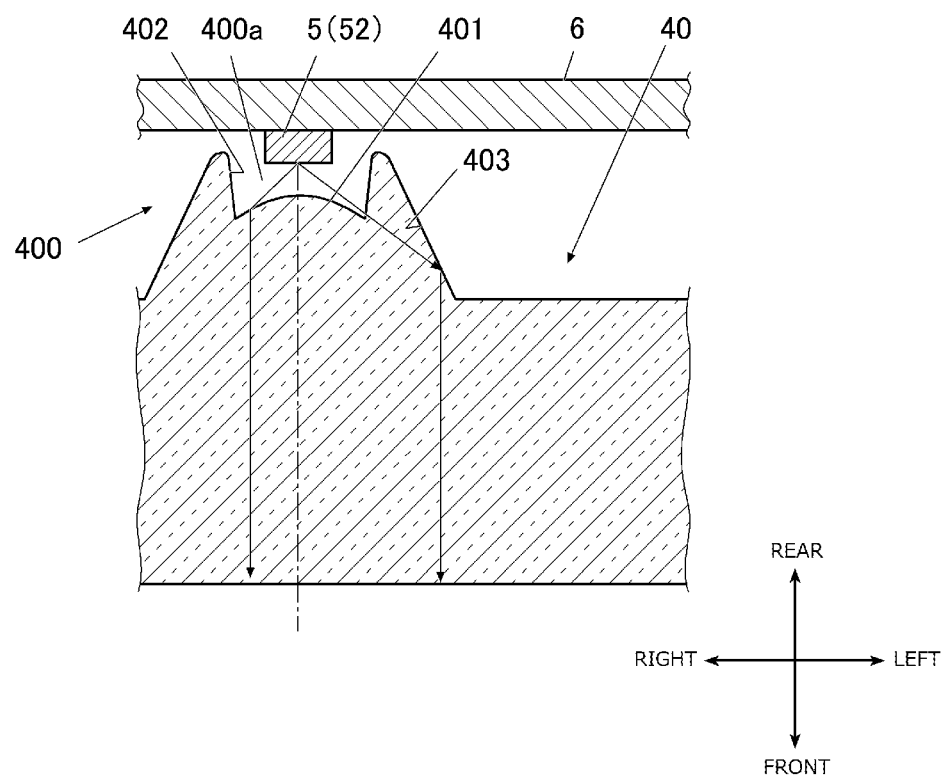
FIG. 5 is a cross-sectional view of the vehicle lighting unit taken along line V-V of FIG. 2.

FIG. 2 is a front view of a vehicle lighting unit 1 made in accordance with the principles of the presently disclosed subject matter. FIG. 3 is a perspective view of the parts of the vehicle lighting unit 1. FIGS. 4 and 5 are cross-sectional views of the vehicle lighting unit taken along line IV-IV and line V-V of FIG. 2, respectively.

In the present specification, the term "front," "rear (back)," "left," "right," "up (upper)," and "down (lower)" mean the respective directions when viewed from the vehicle lighting unit 1 mounted in place, unless otherwise specified.

As shown in the drawings, the vehicle lighting unit 1 can include a housing 2 opened forward and a plain outer lens 3 configured to cover the front opening of the housing 2. The housing 2 and the outer lens 3 can define a lighting chamber. Inside the lighting chamber, an inner lens 4 and a plurality of (four in the present embodiment) light emitting diodes (LEDs) 5 can be accommodated.

The inner lens 4 can be an elongated light guide bent in a letter U shape lying on its side to open leftward when viewed from the front side. Specifically, the inner lens 4 being the elongated bent light guide can include a bending section 40 positioned at an upper right end of the inner lens 4, and also include a first light guiding section 41 configured to extend leftward along the left-to-right direction (horizontal direction) from the left end of the bending section 40, and a second light guiding section 42 configured to extend downward from the lower end of the bending section 40 and then be bent to extend leftward to be in a letter L shape. The inner lens 4 can be disposed at a certain position so that the respective left ends of the first and second light guiding sections are located to be aligned at the left end of the lighting chamber.

In the rear surface of the inner lens 4, a portion except for a rim portion with a predetermined width can be formed as a recessed section along the entire length of the inner lens 4, and a plurality of prism cuts 4a having a saw-tooth shaped cross section can be formed over the entire surface of the bottom face of the recessed section. Specifically, the plurality of prism cuts 4a can be formed in parallel to each other and side by side along the extending direction of the first light guiding section 41 in the area corresponding to the first light guiding section 41 and the bending section 40 while the plurality of prism cuts 4a can be formed in parallel to each other and side by side along the extending direction of the second light guiding section 42 in the area corresponding to the second light guiding section 42. The plurality of prism cuts 4a can be configured to reflect light that has been emitted from the respective LEDs 5 and incident on the inner lens 4 to the front side while being guided along the respective extending directions within the areas of the first and second light guiding sections 41 and 42.

At the rear portion of the bending section 40 of the inner lens 4, there are formed a plurality of (four in the present exemplary embodiment) incident sections 400 on which light emitted from the LEDs 5 can be incident.

The four incident sections 400 can be divided into two sets of two incident sections, one disposed at the right end portion and the other disposed on the upper end portion of the bending section 40. The two incident sections 400 provided at the right end portion of the bending section 40 can be arranged side by side in the vertical direction on the right side of the first light guiding section 41.

The two incident sections 400 provided at the upper end portion of the bending section 40 can be arranged side by side in the left-to-right direction on the upper side of the first light guiding section 41. Further, the four incident sections 400 can be arranged to correspond to the four LEDs 5 described later so that the respective LEDs 5 are disposed in the rear of the corresponding incident sections 400 to face the corresponding incident sections 400.

Each of the incident sections 400 can be formed to be a truncated conical shape projected rearward, and to have a concave portion 400a opened rearward at its rear end. Specifically, each of the two incident sections 400 can be arranged side by side in the vertical direction at the right end portion of the bending section 40 to be elongated in the vertical direction while each of the two incident sections 400 can be arranged side by side in the left-to-right direction at the upper end portion of the bending section 40 to be elongated in the left-to-right direction. Further, each of the concave portions 400a can be formed to be opened at both sides in the direction perpendicular to the lengthwise direction of the incident section 400.

As shown in FIG. 5, in the bottom portion of the recessed section 400a, a first incident surface 401 of a convex surface (aspherical convex surface) bulged rearward can be formed. The first incident surface 401 can have a focus positioned at the position of the corresponding LED 5, so that the first incident surface 401 receives the light emitted from the LED 5 while collimates the same in the front-to-rear direction.

A second incident surface 402 can be formed in the inner peripheral surface of the concave portion 400a. The second incident surface 402 can be formed to erect from the peripheral edge of the first incident surface 401 rearward and be a partial truncated conical shape, so that part of light emitted from the LED 5 directed sideward outside the first incident surface 401 can be allowed to enter the inner lens 4 (bending section 40).

The outer peripheral surface of the incident section 400 can be formed to be an incident reflection surface 403. The incident reflection surface 403 can be shaped to be a partial truncated conical shape. The shape can be inclined to be spread outward and forward from the tip end (rear end) of the second incident surface 402 so that part of light emitted from the LED 5 incident on the second incident surface 402 and entering the inner lens 4 can be allowed to be internally reflected in the front-to-rear direction.

As shown in FIGS. 2 to 3, in the peripheral edge of the front surface and the peripheral surface of the inner lens 4 except for the inner side of the U-shape and the left end thereof, formed is a chamfered inclined surface 4b with an inclined angle of 45 degrees.

In this configuration, a first reflection surface R1 can be formed in part of the inclined surface 4b at the right end portion of the bending section 40. The first reflection surface R1 can be positioned forward of the two incident sections 400 arranged at the right end portion of the rear portion of the bending section 40 and on the right side of the first light guiding section 41. The first reflection surface R1 can be inclined at 45 degrees both in the left-to-right and front-to-rear directions. The first reflection surface R1 can be configured to internally reflect the light from the two incident sections 400 to the first light guiding section 41 leftward in the left-to-right direction.

A second reflection surface R2 can be formed in part of the inclined surface 4b at the upper end portion of the bending section 40. The second reflection surface R2 can be positioned forward of the two incident sections 400 arranged at the upper end portion of the rear portion of the bending section 40 and on the upper side of the right side portion (extending in the vertical direction) of the second light guiding section 42. The second reflection surface R2 can be inclined at 45 degrees both in the horizontal and vertical directions. The second reflection surface R2 can be configured to internally reflect the light from the two incident sections 400 downward toward the right side portion of the second light guiding section 42 in the vertical direction.

The four LEDs 5 can be mounted on the front surface of the same substrate 6 extending in a direction perpendicular to the front-to-rear direction and located in the rear of the bending section 40 of the inner lens 4 so that their light emission surfaces are directed forward. Specifically, the four LEDs 5 can include two first LEDs 51 and two second LEDs 52. The first LEDs 51 can be arranged side by side in the vertical direction in the rear of the right end portion of the bending section 40. The second LEDs 52 can be arranged side by side in the left-to-right direction in the rear of the upper end portion of the bending section 40.

The first LEDs 51 can be configured to correspond to the two incident sections 400 disposed at the right end portion of the rear portion of the bending section 40 so as to face the two incident sections 400, i.e., in the rear of the first reflection surface R1.

The second LEDs 52 can be configured to correspond to the two incident sections 400 disposed at the upper end portion of the rear portion of the bending section 40 so as to face the two incident sections 400, i.e., in the rear of the second reflection surface R2.

In the vehicle lighting unit 1 with the above-mentioned configuration, when the four LEDs 5 are turned on, the entire front surface of the inner lens 4 can become luminous uniformly.

Specifically, the two first LEDs 51 of the four LEDs 5 can emit light forward, and the two incident sections 400 arranged at the right end portion of the rear portion of the bending section 40 of the inner lens 4 can receive the light to collimate the same in the front-to-rear direction. Then, the light entering the inner lens 4 (bending section 40) can be reflected leftward by the first reflection surface R1. The reflected light can be guided within bending section 40 and the first light guiding section 41 leftward in the left-to-right direction so that the guided light can be reflected forward by the plurality of prism cuts 4a provided to the rear surface of the bending section 40 and the first light guiding section 41. Accordingly, the light can be projected through the front surface of the inner lens 4, whereby the surface of the bending section 40 and the first light guiding section 41 of the inner lens 4 can become illuminated.

The two second LEDs 52 of the four LEDs 5 can emit light forward, and the two incident sections 400 arranged at the upper end portion of the rear portion of the bending section 40 of the inner lens 4 can receive the light to collimate the same in the front-to-rear direction. Then, the light entering the inner lens 4 (bending section 40) can be reflected downward by the second reflection surface R2. The reflected light can be guided within the bending section 40 and the second light guiding section 42 downward as well as guided along the leftward bended second light guiding section 42 so that the guided light can be reflected forward by the plurality of prism cuts 4a provided to the rear surface of the second light guiding section 42. Accordingly, the light can be projected through the front surface of the inner lens 4, whereby the surface of the second light guiding section 42 of the inner lens 4 can become illuminated.

As described, according to the vehicle lighting unit 1 of the present exemplary embodiment, the light emitted forward from the first LEDs 51 can be incident on the inner lens 4 of the rear portion of the bending section 40 and then reflected by the first reflection surface R1 leftward in the left-to-right direction. Then the reflected light can be guided through the first light guiding section 41 and projected through the front surface of the first light guiding section 41. Further, the light emitted forward from the second LEDs 52 can be incident on the inner lens 4 of the rear portion of the bending section 40 and then reflected by the second reflection surface R2 downward in the vertical direction. Then the reflected light can be guided through the second light guiding section 42 and projected through the front surface of the second light guiding section 42.

Since the first and second light guiding sections 41 and 42 of the inner lens 4 can independently become luminous by the first and second LEDs 51 and 52, the inner lens 4 can become luminous more uniformly when compared with the case where a light source is arranged only at one end of a light guide in a conventional configuration.

In the vehicle lighting unit 1 with the above-mentioned configuration, both the first and second LEDs 51 and 52 can be disposed in the rear of the bending section 40 of the inner lens 4. Thus, when compared with the conventional case where light sources are disposed to face respective ends of an elongated light guide, the first and second LEDs 51 and 52 can be collectively mounted on the single substrate 6. In addition to this, any concealing member for concealing a light source can be eliminated, and in turn, the number of parts can be decreased. Even with this configuration, the above-mentioned vehicle lighting unit 1 can achieve the provision of the respective left ends of the first and second light guiding sections 41 and 42 opposite to the bending section 40 at the end portion of the lighting chamber.

Therefore, with fewer numbers of parts than the conventional lighting unit, it is possible to dispose the elongated bent inner lens 4 at the end portion of the lighting chamber while the inner lens 4 can become luminous uniformly.

Note that the embodiments to which the presently disclosed subject matter can be applied should not be limited to the described embodiments, but may be appropriately modified within the scope departing from the sprit or scope of the presently disclosed subject matter.

For example, although the LEDs 5 are described as light sources for the vehicle lighting unit 1 in the above-described embodiment, any light sources such as a laser diode (LD) or the like can be used as long as they can be mounted on a substrate.

Further, the respective directions in which the first and second light guiding sections 41 and 42 extend from the bending section 40 should not be limited to the left-to-right direction and vertical direction, but can be directions crossing each other when viewed from its front side (namely, in the illumination direction of the lighting unit).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit for emitting light in a front direction, the vehicle lighting unit comprising:
    a light source mounted on a substrate; and
    an elongated light guide configured to receive light emitted from the light source and guide the light along a lengthwise direction of the light guide so as to emit light from a front surface of the light guide,
    the light guide having a first light guiding section and a second light guiding section that extend in a first direction and a second direction, respectively, and a bending section between the first and second light guiding sections, the first direction and the second direction crossing each other when viewed from a front side of the vehicle lighting unit so that the light guide bends at the bending section, wherein
    the first light guiding section is configured to extend leftward or rightward along a horizontal direction as the first direction from a right or left end of the bending section in the horizontal direction,
    the second light guiding section is configured to extend upward or downward along a vertical direction as the second direction from a upper or lower end of the bending section in the vertical direction,
    the light guide has a rear surface configured to include a rim portion with a predetermined width, a recessed section surrounded by the rim portion and formed along an entire length of the light guide, and a plurality of incident sections formed at a rear portion of the bending section corresponding to the light source, with a plurality of prism cuts formed in a bottom face of the recessed section,
    the plurality of incident sections are a first incident section formed at the left or right end disposed on the side opposite to the direction in which the first light guiding section extends when viewed from its front side, and a second incident section formed at the upper or lower end disposed on the side opposite to the direction in which the second light guiding section extends when viewed from its front side,
    the light guide has a front surface configured to include a chamfered inclined surface with a predetermined inclined angle with respect to the front surface and a peripheral surface of the light guide, the inclined surface configured to include a first reflection surface arranged at the right or left end of the bending section so as to face to the first incident section when viewed from its front side and a second reflection surface arranged at the upper or lower end of the bending section so as to face to the second incident section when viewed from its front side,
    the first reflection surface configured to internally reflect light from the light source toward the first light guiding section substantially in the first direction, the second reflection surface configured to internally reflect the light from the light source toward the second light guiding section substantially in the second direction,
    the light source includes a first light source and a second light source, the first light source being disposed at a rear of the first reflection surface of the bending section while facing forward, and the second light source being disposed at a rear of the second reflection surface of the bending section while facing forward, and
    the first light guiding section and the second light guiding section independently become luminous by the first light source and the second light source.

2. The vehicle lighting unit according to claim 1, wherein the substrate extends to be orthogonal to a front-to-rear direction of the vehicle lighting unit and has a front surface, and the first and second light sources are mounted on the front surface of the substrate.

3. The vehicle lighting unit according to claim 1, wherein the light incident sections are configured to receive light emitted from the light source such that the light enters the bending section while the light is collimated in a front-to-rear direction.

4. The vehicle lighting unit according to claim 2, wherein the incident sections are configured to receive light emitted from the light source such that the light enters the bending section while the light is collimated in a front-to-rear direction.

5. The vehicle lighting unit according to claim 1, wherein the plurality of prism cuts each have a saw-tooth shaped cross section formed over substantially the entire rear surface so as to direct guided light forward.

6. The vehicle lighting unit according to claim 2, wherein the plurality of prism cuts each have a saw-tooth shaped cross section formed over substantially the entire rear surface so as to direct guided light forward.

7. The vehicle lighting unit according to claim 1, wherein part of the plurality of prism cuts are formed in parallel to each other and side by side along the first direction in an area of the rear surface corresponding to the first light guiding section and the bending section, and part of the plurality of prism cuts are formed in parallel to each other and side by side along an extending direction of the second light guiding section in an area of the rear surface corresponding to the second light guiding section so that the plurality of prism cuts reflect the light entering the light guide forward.

8. The vehicle lighting unit according to claim 2, wherein part of the plurality of prism cuts are formed in parallel to each other and side by side along the first direction in an area of the rear surface corresponding to the first light guiding section and the bending section, and part of the plurality of prism cuts are formed in parallel to each other and side by side along an extending direction of the second light guiding section in an area of the rear surface corresponding to the second light guiding section so that the plurality of prism cuts reflect the light entering the light guide forward.

9. The vehicle lighting unit according to claim 1, wherein the chamfered inclined surface is formed at least along the peripheral surface of the light guide with the inclined angle of 45 degrees with respect to the front surface of the light guide.

* * * * *